April 27, 1965

W. E. GRUBEN ETAL 3,180,504

POWER LOADER

Filed Sept. 12, 1962

INVENTORS.
W. E. GRUBEN
A. E. MONSON
BY *William A. Murray*
ATTORNEY

April 27, 1965   W. E. GRUBEN ETAL   3,180,504
POWER LOADER

Filed Sept. 12, 1962   3 Sheets-Sheet 2

INVENTORS.
W. E. GRUBEN
A. E. MONSON
BY William A. Murray
ATTORNEY

INVENTORS.
W. E. GRUBEN
A. E. MONSON

United States Patent Office 3,180,504
Patented Apr. 27, 1965

3,180,504
POWER LOADER
Wayne E. Gruben, Lafayette, Ind., and Aubrey E. Monson, Moline, Ill., assignors to Deere & Company, Moline, Ill., a corporation of Delaware
Filed Sept. 12, 1962, Ser. No. 223,185
8 Claims. (Cl. 214—140)

This invention relates to a power loader and particularly to the combination of self-leveling mechanism and mounting mechanism between the carriage and the side push beams of the power loader. Still more particularly this invention relates to an improved power loader primarily used in combination with a hay stacking device.

The primary object of the present invention is to provide a new and novel method of retaining a fixed angular position of the material carriage relative to the ground regardless of the vertical position of the side beams and to further provide a rather unique manner of supporting the load carriage on the forward end of the side beams. Relative to the latter, it is proposed to provide a pair of upright arms at the forward end of each side beam which are pivotally interconnected at their lower ends and are also pivotally connected to the forward end of the side beams. An hydraulic cylinder extends between the upright arms so that the upper ends of the arms may be moved toward or away from one another. The forward of the two arms is adapted for connection to the load carriage and the rearward of the two arms is adapted for connection to a stabilizing link connected to the respective side beam.

In a conventional type loader there is normally not a problem of contact between the forward end of the tractor and the load carriage. However, when the load carriage is composed of a more or less conventional type hay stacker having a relatively high rear upright portion, interference between the forward end of the tractor and the rear upright portion of the stacker is a problem. Normally this is overcome by positioning the rear upright portion of the stacker sufficiently forwardly of the tractor so that interference does not occur. However, it is always desirable to place the carriage as close to the tractor as possible for balance purposes. It is therefore a further primary object of the present invention to incorporate in the above type of connecting means between the push beams and the load carriage a by-pass valve which may be actuated incident to the two arms swinging together, which occurs as the stacker swings rearwardly, to shut off the supply of fluid to the hydraulic cylinders upon the rear upright portion of the hay stacker approaching contact with the front of the tractor.

As a further object, a parallel linkage system is provided to maintain the rear of the two upright arms in a substantially constant angular position relative to the ground and consequently to swing forwardly on the push beams as the push beams are raised. Consequently as the hay stacker is moved to a height above the forward end of the tractor the entire stacker may be tilted rearwardly without contacting the shutoff valve mechanism. Therefore, when the hay stacker is at ground level, it is limited in its rearward movement relative to the tractor and when it is above the level of the tractor it may be swung considerably further rearwardly than was contemplated at ground level. Therefore, the stacker or load carriage may be supported closely adjacent the forward end of the tractor without effecting the undesirable effect of the carriage contacting the forward end of the tractor.

Other objects and advantages of the present invention will become apparent to those skilled in the art as the nature of the invention is better understood from the following description and as shown in the accompanying drawings.

Figure 1:
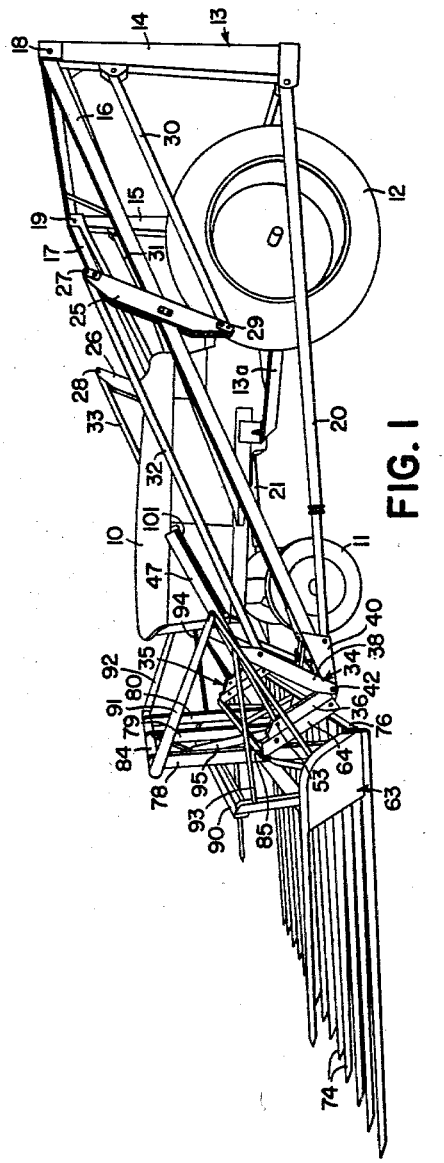
FIG. 1 is a side perspective view of a tractor and the entire power loader.

Referring now to FIG. 1, there is provided a tractor having a tractor body 10 with front steerable wheels 11 and rear traction wheels 12. The tractor serves as the main support for the entire power loader through means of the main frame 13 composed of a pair of upright main supports 14, 15 positioned rearwardly and outboard of the main traction wheels 12. Suitable subframework 13a fixes the main supports 14, 15 to the tractor body 10. A pair of push beams or booms 16, 17 are pivotally connected, as at 18, 19, to the upper ends of the upright supports 14, 15 respectively and extends forwardly therefrom to forward ends forwardly of but relatively close to the forward end of the tractor body 10. A pair of hydraulic lift cylinders 20, 21 extends between the lower ends of the supports 14, 15 and the extreme forwards ends of the respective push beams 16, 17.

Crossover links 25, 26 are pivotally mounted on intermediate portions of the push beams 16, 17 so as to swing fore and aft on the beams. The cross arms 25, 26 have upper ends, as indicated by pivots 27, 28, above the push beams 16, 17 and lower ends, such as is indicated by the pivot 29 of the left crossover link 25, positioned below the respective beams 16, 17. A lower first pair of links 30, 31 extends from the upright support 14, 15 to the lower ends or pivots of the crossover links 25, 26. The first links 30, 31 are substantially parallel to the push beams 16, 17. A second pair of links 32, 33, also parallel to the push beams 16, 17 extends from the upper ends or pivots 27, 28 of the crossover links 25, 26 forwardly to arm structures, indicated in their entireties by the reference numerals 34, 35, at the forward ends of the push beams 16, 17.

Figure 3:
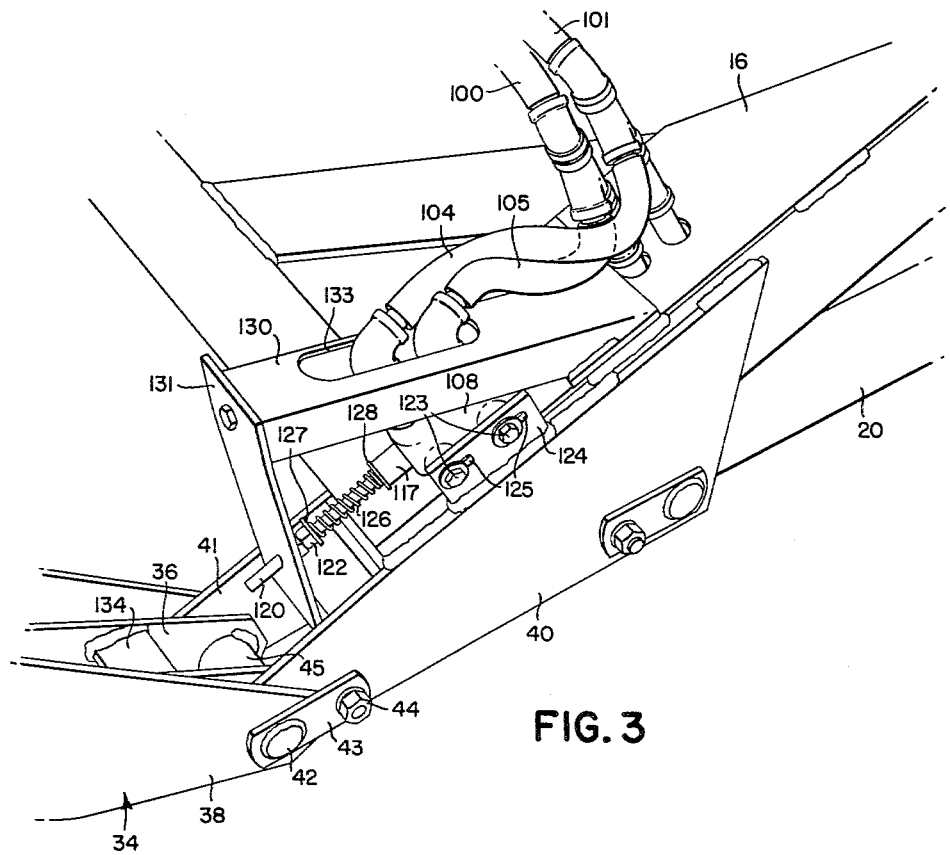
FIG. 3 is a side and overhead perspective view of the forward end of the push beam and the rear portion of the connecting linkage for the load carriage.

The arm structures 34, 35 are composed of forward upright arms 36, 37 respectively and rear upright arms 38, 39 respectively. Referring to FIG. 3 for mounting details of the left forward arm structure 34, there are provided reinforcing or gusset plates 40, 41 on opposite sides of the forward end of the push beam 16. A transverse pivot pin 42 is provided adjacent the forward tips of the gusset plates 40, 41, suitable openings, not shown, being provided to receive the pin. The pin 42 is held in position by means of a radial arm or plate 43 bolted, as at 44, to the left gusset plate 40.

Figure 2:
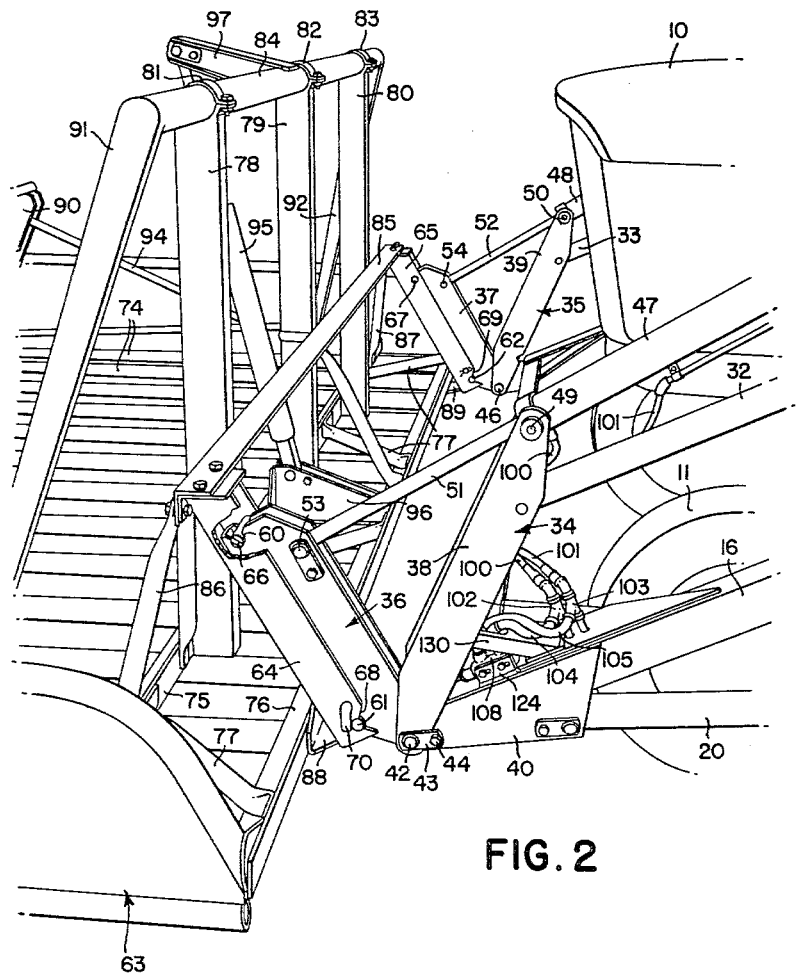
FIG. 2 is an enlarged side perspective view of the connecting linkage between the forward end of the push beams and the rear portion of the load carriage.

The rear arm 38 is composed of a pair of upright plates positioned on opposite sides of the gusset plates 40, 41 and pivotally mounted thereto by the pivot pin 24. The forward arm 36 is U-shaped, as is shown in FIG. 2, and is retained inboard of the respective gusset plates 40, 41 and carried on the pivot pin. A suitable short pipe type journal extends between the legs of the U-shaped arm to receive the pivot pin 42. Therefore, the pivot pin 42 provides a pivotal connection of the entire forward arm structure 34 on the push beam 16 and also provides a pivotal interconnection between the front and rear arms 36, 38 respectively. A similar arrangement for pivotally interconnecting the arms 37, 39 to the right push beam 17 is provided on the right side of the tractor and for the right arm structure 35. The pivotal connection is indicated by its pivot pin 46.

A pair of hydraulic cylinders 47, 48 is connected to the pair of rear arms 38, 39 at their upper ends and by pivotal mountings, as indicated at 49, 50. Hydraulic rams 51, 52 extend forwardly from their respective cylinders 47, 48 and are pivotally connected at 53, 54 to the upper ends of the forward arms 36, 37.

The front upright arm 36 has its upper edge notched as at 60 to open upwardly. Also, the arm 36 has a pair of outwardly projecting lugs, as at 61, on opposite sides thereof. The arm 37 on the right side of the tractor also has a similarly located notch, not shown, and lugs 62 on opposite sides thereof. Viewing FIG. 2, the load carriage, indicated in its entirety by the reference numeral 63, has a pair of upright U-shaped beams 64, 65 opening rearwardly and adapted to receive the forward upright arms 36, 37. A pair of transverse rods 66, 67 extend across the upright beams 64, 65 are are disposed to be seated in the notches, as at 60, in the upper edges of the upright arms 36, 37. The beams 64, 65 also have rearwardly opening notches 68, 69 for receiving the lugs 61, 62. The upright member 64 and the U-shaped upright arm 36 as well as the upright member 65 and its upright arm 37 are provided with openings normally in registry with one another for receiving a locking pin, such as is shown at 70, extending through the respective members and arms for locking the arms to the members. It therefore becomes apparent the arms 36, 37 are easily detachable as well as attachable to the respective upright members 64, 65 merely by removing or replacing the respective pins 70. It should be recognized that other types of material carrying implements may be easily attached or detached from the respective beams 16, 17 merely by having a suitable pair of upright stands for receiving the upright arm members 36, 37.

The particular material carrying carriage 63 includes a pair of transverse fore-and-aft spaced apart channels 75, 76 braced at 77 for rigidity. Fixed to the underside of the channels 75, 76 by any suitable means are parallel fore-and-aft extending hayrack teeth 74. Also fixed to the front transverse beam 75 are three parallel upright channels 78, 79 and 80 having at their upper ends bearings 81, 82, 83 receiving a transverse beam or shaft 84. The U-shaped upright frames 64, 65 are rigidly joined at their upper ends by a transverse angle iron member 85 which in turn is braced at 86, 87 to the front channel or frame member 75. The lower ends of the upright channels 64, 65 are fixed to pads 88, 89 projecting rigidly rearwardly from the rear frame member 76.

Push-off means is provided to move material off of the rake teeth 74 and includes an upright push-off structure 90 which extends across the entire expanse of the rack and is connected to the upper transverse beam 84 by means of arms 91, 92 extending from opposite ends of the shaft 84 and pivotally connected at their free ends to rearwardly projecting bracket structures 93, 94 which extend forwardly to be connected to the push-off structure 90. This structure is clearly evident from viewing FIG. 1 in which the push-off structure 90 is in its retracted position and in FIG. 2 in which the push-off structure 90, only partially shown, is in its forward or extended position. Means for rotating the shaft 84 is provided by an hydraulic cylinder 95 connected to upright plates 96 carried on the transverse beams 75, 76. A rock arm 97 projects forwardly from the shaft 84 and is connected to the ram portion of the cylinder 95.

As may be seen from viewing FIGS. 1 and 2, if the cylinders 47, 48 were completely retracted there would be interference occurring between the rear upright structure including the shaft 84, frames 78, 79, 80 and the forward end of the tractor. To prevent such interference there is provided by-pass valve mechanism for each of the hydraulic cylinders 47, 48. Referring to the cylinder 47, fluid is provided at opposite ends of the cylinder by means of fluid conduits 100, 101 respectively. Fluid is provided under pressure by a conventional-type hydraulic system on the tractor which feeds through fluid conduits contained within the push beam 16. Fittings 102, 103 are provided in the respective line 100, 101 and hose assemblies 104, 105 extend to and are connected to suitable openings 106, 107 in a by-pass valve casing 108. A fluid discharge opening 109 is provided in the casing 108 and feeds through a hose, not shown, which returns the fluid to a main fluid reservoir on the tractor.

Figure 4:
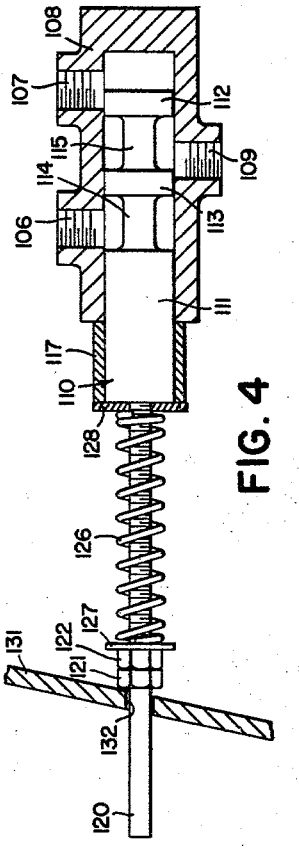
FIG. 4 is an enlarged sectional view through the by-pass valve mechanism for the hydraulic tilting cylinders.

A spindle-type valve 110 is contained within the casing 108 and has enlarged ends 111, 112 and an enlarged central portion 113. Recessed sections 114, 115 separate the enlarged portion 111–113. The enlarged end 110 projects outwardly of the casing 108 and has threaded thereto a forwardly projecting operator or rod 120. The latter has secured thereto a pair of nuts 121, 122. A sleeve 117 is supported on the enlarged portion 110 and abuts the end of the casing 108. The casing 108 is bolted at 123 to a bracket 124 projecting upwardly from the upper edge of the gusset plate 40. The bracket has elongated fore-and-aft extending slots 125 which permits a fore-and-aft adjustment of the entire casing 108. A spring 126 is positioned on the rod portion 120 between a pair of washers 127, 128 which abut the nut 122 and the sleeve 117. The purpose of the spring 126 is to bias the spindle to a position substantially as shown in FIG. 4.

Overlying the entire valve system is a protective housing structure composed of an overlying channel 130 fixed to the top plate of the beam 16 and an upright plate 131 which is fixed to the forward end of the overlying beam 130 and to the gusset plates 40, 41. The plated 131 has an opening 132 through which the forward end of the rod 120 extends. The overhead beam 130 has an opening 133 through which the fluid conduit lines 104, 105 may pass.

Fixed to opposed side plates of the U-shaped channel 36 is an abutting plate 134 which is in alinement with the end of the control rod 120. Such is clearly shown in FIG. 3. It becomes apparent that upon the beam 36 moving rearwardly sufficiently, the abutment 134 will contact the end of the rod 120 and move the entire valve axially until the enlarged central recessed portion 113 uncovers the discharge opening 109 and the enlarged portion 112 uncovers the fluid inlet 107. As soon as this occurs, fluid may pass from the inlet 106 through the discharge 109 and from the inlet 107 through the discharge 109 and from thence into the reservoir, not shown. Since the fluid for the hydraulic cylinders 47, 48 will take the line of least resistance, the fluid will immediately pass into the discharge reservoir and not to the cylinders 47, 48. The valve is so positioned relative to the beam 36 that the shaft 84 and the upright structural members 78, 79 and 80 will not contact the forward end of the tractor body 10.

It should also be recognized that the by-pass relief valve system is from a practical standpoint only available in the down position. This is due to the fact that upon the push beams 16, 17 being raised at a height above the tractor, the self-leveling system consisting of the parallel linkages 30–33 and the cross-over arms 25, 26 will automatically push the forward upright arms 36 away from contact with the rod 120. Upon the beams 16, 17 being raised, therefore, the relief valve system will permit the rake teeth 74 to be inclined rearwardly so that the extreme forward ends thereof are at a maximum height, the by-pass valves will permit such inclination without shutting off or by-passing fluid from the tilting cylinders 47, 48.

While only one form of the invention has been shown, it should be recognized that other forms and variations will occur to those skilled in the art. Therefore, while the present form was shown and described in detail for purposes of concisely illustrating the principles of the invention, it was not the intention to limit or narrow the invention beyond the broad concepts set forth in the appended claims.

What is claimed is:

1. Connecting and positioning structure between a material carriage and the forward ends of opposed side push beams of a loader, comprising: two pair of front and rear upright arms, each pair being pivotally interconnected at their lower ends to swing about a transverse axis; means on each of the pairs for pivotally mounting the arms on the forward ends of the push beams; means on each of the front arms for detachably connecting the carriage; means on each of the rear arms for detachable connection to a stabilizing and positioning mechanism on its respective beam; extensible and retractable hydraulic units connected to and extending between the front and rear arms for opening and closing the gap between the arms; a fluid transferring means associated with each of the hydraulic units; a by-pass valve means in the fluid transferring means; and an external control element for the by-pass valve means adapted for support on the forward ends of the beams operatively associated with the arms and incident to closing of the gap between the arms to operate the by-pass valve means.

2. A connecting device between a material handling implement of the type having a forwardly positioned material contacting portion and a pair of rearwardly positioned upright and transversely spaced supports, the latter having laterally extending rods at their upper ends and rearwardly opening notches at their lower ends, and the forward ends of opposed side push beams, the connecting device comprising: two pair of front and rear upright arms, each pair being pivotally interconnected at their lower ends to swing about a transverse axis; means on each of the pairs for pivotally mounting the arms on the forward ends of the push beams with said front arms normally being disposed alongside the respective upright supports; means defining upwardly opening notches on the upper portions of the arms for receiving the rods; lateral lugs on the lower portion of the arms for receipt in the notches of the supports; means for detachably connecting the front arms and supports; means on each of the rear arms for detachable connection to a stabilizing element on a respective beam; extensible and retractable hydraulic units connected to and extending between the front and rear arms for tilting the front arms relative to the rear arms; a fluid transferring means associated with each of the hydaulic units; a by-pass valve in the fluid transferring means; and an external control element for each of the by-pass valves associated with the arms and incident to closing of the gap between the arms to operate the by-pass valve.

3. A connecting device between a material handling implement of the type having a forwardly positioned material contacting portion and a pair of rearwardly positioned upright and transversely spaced supports, the latter having laterally extending rods at their upper ends and rearwardly opening notches at their lower ends, and the forward ends of opposed side push beams, the connecting device comprising: two pair of front and rear upright arms, each pair being pivotally interconnected at their lower ends to swing about a transverse axis; means on each of the pairs for pivotally mounting the arms on the forward ends of the push beams with said front arms normally being disposed alongside the respective upright supports; means defining upwardly opening notches on the upper portions of the arms for receiving the rods; lateral lugs on the lower portion of the arms for receipt in the notches of the supports; means for detachably connecting the front arms and supports; means on each of the rear arms for detachable connection to a stabilizing element on a respective beam; and extensible and retractable hydraulic units connected to and extending between the front and rear arms for tilting the front arms relative to the rear arms.

4. A material loader for a tractor comprising: a main loader frame including parts thereof on opposite sides of the tractor; a pair of push beams on opposite sides of the tractor having rear ends thereof pivoted on the frame for vertical movement and extending forwardly to front ends forwardly of the tractor; power means for raising and lowering the push beams; a cross-over link intermediate the ends of each of the push beams with an upper end portion above and a lower end portion below the respective beam and pivotally mounted for fore-and-aft movement on the beam; first and second upright arms pivotally mounted at their lower ends on each of the forward ends of the push arms; first and second links extending between the frame and the lower end portions of the cross-over links and between the upper ends of the cross-over links and the first of the arms respectively, and for maintaining the latter at a substantially constant angular relation in respect to the ground; extensible and retractable connecting means between the first and second arms including hydraulic units effective to move the second arms fore-and-aft relative to the first arms about the respective lower ends of the first and second arms; a carriage mounted on the second arms and adapted to be tilted in response to adjustment of the hydraulic units, the carriage having an upright rear transverse portion closely adjacent the front of the tractor; fluid by-pass valve means associated with the hydraulic units effective to deactivate the extensible and retractable means; control means mounted on at least one of the push beams adjacent its forward end including a contact element disposed in the path of swing of the second arms and carriage and responsive to operate the by-pass valve means upon the carriage approaching contact with the forward end of the tractor.

5. A material loader for a tractor comprising: a main loader frame including parts thereof on opposite sides of the tractor; a pair of push beams on opposite sides of the tractor having rear ends thereof pivoted on the frame for vertical movement and extending forwardly to front ends forwardly of the tractor; power means for raising and lowering the push beams; a cross-over link intermediate the ends of each of the push beams with an upper end portion above and a lower end portion below the respective beam and pivotally mounted for fore-and-aft movement on the beam; upright arms pivotally mounted at their lower ends on the forward ends of the push arms; first and second links extending between the frame and the lower end portions of the cross-over links and between the upper ends of the cross-over links and the arms respectively for maintaining the arms at substantially constant angular disposition relative to the ground as the push beams are raised and lowered; material carriage means mounted for pivotal movement relative to the arms and having an upright portion closely adjacent the forward end of the tractor; extensible and retractable connecting means between the arms and carriage means including hydraulic units effective to move the carriage means fore-and-aft relative to the arms; fluid by-pass valve means associated with the hydraulic units effective to deactivate the extensible and retractable means; external control means associated with the by-pass valve means mounted on and adjacent the forward end of at least one push beam with a contact portion disposed to contact the carriage means for operating the by-pass valve means upon the carriage means approaching contact with the forward end of the tractor.

6. A material loader for a tractor comprising: a main loader frame including parts thereof on opposite sides of the tractor; a pair of push beams on opposite sides of the tractor having rear ends thereof pivoted on the frame for vertical movement and extending forwardly to front ends forwardly of the tractor; power means for raising and lowering the push beams; material carriage means mounted for pivotal movement on the forward ends of the beams and having an upright portion closely adjacent the forward end of the tractor; angular positioning means for adjusting the carriage on the push beams including extensible and retractable hydraulic units effective to pivot the carriage means fore-and-aft relative to the beams, said positioning means further including automatic control mechanism responsive to vertical movement of the beams to automatically adjust the carriage means relative to the beams to substantially retain a preadjusted angular position of the carriage means relative to the ground; fluid valve means associated with and for operating the hydraulic units; external control means associated with the valve means supported on and adjacent at least one of the forward ends of the push beams and having an operator in operative association with the carriage means for adjusting the valve means upon the carriage means approaching contact with the forward end of the tractor so as to prevent contact therewith.

7. The invention defined in claim 6 in which the operator is in the form of an abutment element position to contact the carriage means as it moves closely adjacent the forward end of the tractor.

8. In a tractor-mounted loader having a pair of push beams pivotally supported on opposite sides of a tractor with ends thereof projecting beyond the end of the tractor and a material carriage adjacent the ends, the combination therewith of a connecting device between the ends and carriage, comprising: two pairs of front and rear upright arms, each pair being pivotally interconnected at their lower ends to swing about a transverse axis; means on each of the pairs for pivotally mounting the arms on the ends of the push beams; means on each of the front arms for detachably connecting the carriage to the front arm in response to adjustment of the arms; means on each of the rear arms for detachable connection to a stabilizing element on its respective beam; and extensible and retractable hydraulic units connected to and extending between the front and rear arms for opening and closing the gap between the arms.

References Cited by the Examiner
UNITED STATES PATENTS

| | | | |
|---|---|---|---|
| 2,595,661 | 5/52 | Horn | 214—131 X |
| 2,654,494 | 10/53 | Stratman | 214—140 X |
| 2,676,719 | 4/54 | Wagner et al. | 214—140 X |
| 2,754,986 | 7/56 | Ferro. | |
| 2,782,946 | 2/57 | Hough. | |
| 2,833,432 | 5/58 | Foster | 214—131 |
| 2,883,077 | 4/59 | Pilch. | |
| 3,044,196 | 7/62 | Kinney | 214—130 X |

HUGO O. SCHULZ, *Primary Examiner.*